United States Patent [19]
Miller, Jr.

[11] 3,938,254
[45] Feb. 17, 1976

[54] GAGING ASSEMBLY FOR AUTOMATICALLY CONTROLLED WHEEL LATHES

[75] Inventor: William R. Miller, Jr., Rochester, N.Y.

[73] Assignee: USM Corporation, Boston, Mass.

[22] Filed: Aug. 30, 1974

[21] Appl. No.: 502,217

[52] U.S. Cl............ 33/203.11; 33/172 E; 33/174 L
[51] Int. Cl.²......................................... B23B 5/28
[58] Field of Search............. 33/203.11, 203, 174 L, 33/172 E; 82/8, 14 D; 51/165.91

[56] References Cited
UNITED STATES PATENTS

| | | | |
|---|---|---|---|
| 1,346,748 | 7/1920 | Hedges | 33/203.11 |
| 3,347,117 | 10/1967 | Luzina et al. | 82/8 |
| 3,518,914 | 7/1970 | Dombrowski et al. | 82/8 |
| 3,848,513 | 11/1974 | Manyek | 82/8 |

FOREIGN PATENTS OR APPLICATIONS

| | | | |
|---|---|---|---|
| 541,931 | 1/1932 | Germany | 33/203.11 |

Primary Examiner—William D. Martin, Jr.
Attorney, Agent, or Firm—Ralph D. Gelling; Vincent A. White; Richard B. Megley

[57] ABSTRACT

The subject invention involves a device for sensing the depth to which a worn railroad wheel must be machined in order to reclaim the wheel tread and flange contour. The device consists of an assembly of gaging elements mounted on a support block which is, in turn, mounted on a guide rail for radial movement into contact with the wheel tread. The gaging elements include a flange edge contactor slidably mounted on the support block, a tread contactor slidably mounted on the flange edge contactor, and a flange contacting finger pivotally mounted to the tread contactor. In operation the assembly is moved radially toward the wheel until the wheel tread is contacted. The tread contactor thereafter retracts, causing the flange contacting finger to engage the gaging point on the wheel flange. Further, downward movement of the assembly causes the flange edge contactor to move into engagement with the wheel. Appropriate encoders are connected to the gage assembly to generate pulses which indicate the position of the flange edge and the new diameter to which the wheel is to be machined.

11 Claims, 7 Drawing Figures

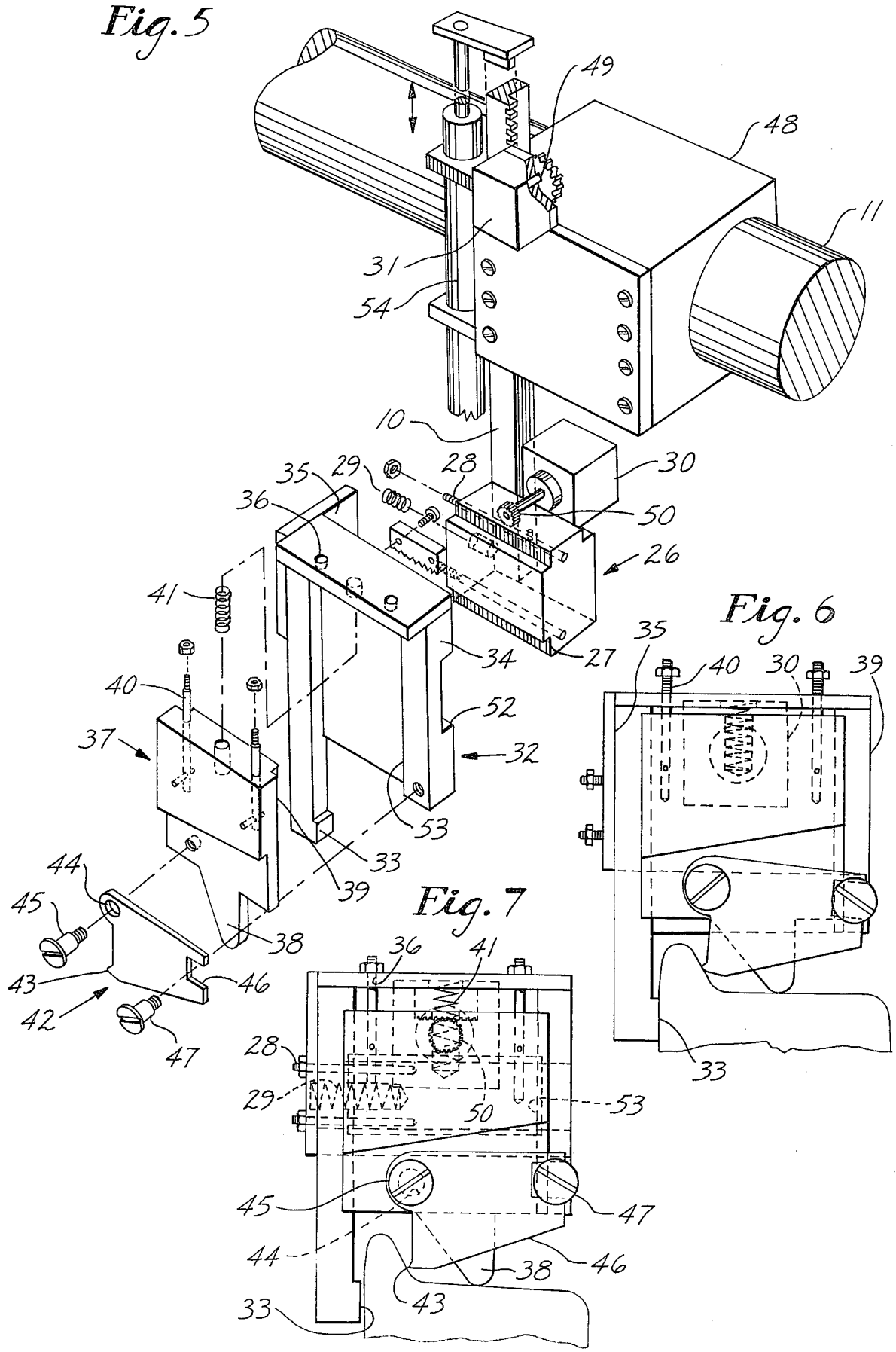

3,938,254

GAGING ASSEMBLY FOR AUTOMATICALLY CONTROLLED WHEEL LATHES

BACKGROUND OF THE INVENTION

As is the case in any moving vehicle, an important factor in the smooth, safe and efficient operation of a railroad car is the condition of the wheel surface which engages the rails. This surface is originally machined within fairly close tolerances to a specific contour. This contour consists of a tread which gradually tapers outward from its axis from its tread edge to an outwardly extending flange which culminates in the flange edge of the wheel. This surface engages the rail in a manner which causes maximum wear in the transition area between tread and flange. Historically, worn railroad wheels have been reclaimed by machining the wheel to a new diameter at which there is sufficient material to restore the original contour. This process must be performed equally around the wheel tread circumference of both wheels in a set. There is of course minimum requirements for flange thickness and wheel diameter which limit the number of times a wheel can be reclaimed. In the process of machining a railroad wheel several dimensions and reference points on the wheel must be measured and located. Since the wheel turning lathes of the prior art are substantially manually adjusted, calipers and gages were provided which were to be manipulated and read by the operator. These readings would be used to set the starting point and depth of cut before the machining operation. Actual tool movement was controlled mechanically by a template corresponding to the desired contour. In general, calipers were provided on the machine which could be moved into contact with the tread surface and flange edge of the wheel, thereby ascertaining the actual worn diameter of the wheel and the location of the flange edge. According to normal procedure, a a gaging point is selected on the tread face of the flange. In general, this point is chosen at the location of maximum wear. A manual gage (A. A. R. steel wheel gage) as shown in FIG. 3 of the drawing described below is widely used to detemine the change in position of this gaging point or change in flange thickness from the original contour. By pivoting the movable finger shown in the manual gage into contact with the gaging point, the amount of change can be read. This distance is generally used to determine the depth of cut required to restore the contour.

Since it is desired to automatically control the movement of the lathe tool, a device is needed to automatically obtain these readings and convert them to a form which is readable by the automatic control system. It is, therefore, the purpose of this invention to provide such a gaging assembly.

BRIEF DESCRIPTION OF THE INVENTION

In a railroad wheel lathe twin gaging assemblies are provided for slidable engagement with the wheel contour. The gage assemblies are mounted on the lathe in a retracted position which is fixed with respect to the turning axis of the lathe. A set of railroad wheels are mounted for rotation on the turning axis of the lathe and the gage assembly is radially moved into contact with the tread surface of the wheel.

The assembly includes a flange edge contactor which is slidably mounted on a support block for movement perpendicular to the radial movement of the entire assembly. This element is spring biased away from the flange edge. Slidably connected to this member is a tread contactor which has a direction of movement parallel to the overall movement of the assembly and is spring biased radially toward the tread surface. A flange engaging finger is pivotally mounted on the tread contactor and is also pivotally fixed at another point to the flange edge contactor. In operation, the assembly is moved radially toward the wheel center until the tread contactor engages the tread surface of the wheel and as the gage assembly continues to move toward the wheel center, the tread contactor retracts within the assembly against its biasing spring. This retraction causes the flange engaging finger to rotate into contact with the flange at the gaging point. Further downward movement of the gage assembly will cause the flange edge contactor to move into contact with the flange edge in motion against its biasing spring. Overall movement of the assembly stops when such engagement is achieved. A first encoder is provided which generates pulses according to the overall radial movement of the gage assembly. The signal generated thereby is used to ascertain the new diameter to which the wheel will be ground. A second encoder generates a signal proportional to the movement of the flange edge contactor, thereby locating the flange edge, the latter signal being used to locate the starting point for the tool. In this manner a device is provided which supplies the automatic control system for the wheel turning lathe with the required information, without the need for manual adjustment by the operator.

BRIEF DESCRIPTION OF THE DRAWING

The instant invention is more fully described in conjunction with the appended drawing which shows a preferred embodiment of the invention and in said drawing:

FIG. 5 is an exploded perspective view of the gaging assembly and its associated elements;

FIG. 6 is a plan view of the gage assembly with all contacting fingers engaging the wheel contour, the gage assembly being shown in partial section; and FIG. 7 is a plan view of the gaging assembly with only the tread contactor engaging the wheel contour.

THE PREFERRED EMBODIMENT

Figure 1:
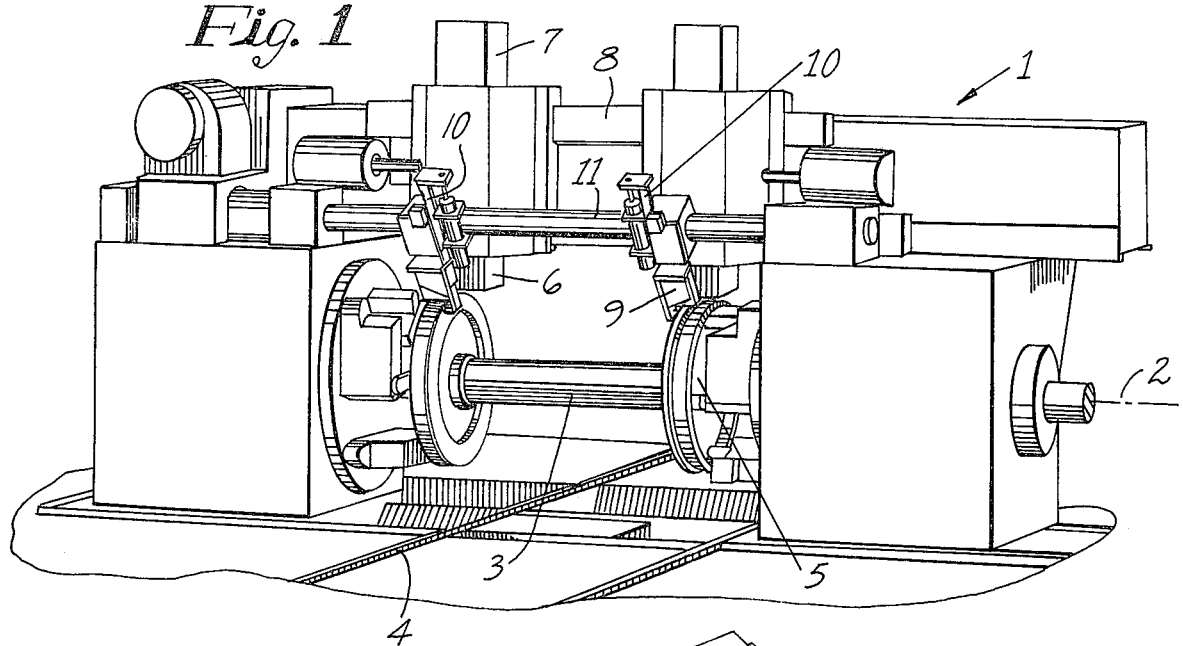
FIG. 1 is a schematic, perspective view of a wheel grinding lathe with which the invention may be associated.

This invention is adapted for use with a wheel grinding lathe 1 generally of the type shown in FIG. 1. Basically, the operation of such machines consists of moving a wheel set 3, along rails 4 into the lathe and mounting the wheel set for rotation about the turning axis 2 of the lathe by means of mounting lugs 5. A pair of tools 6 move into cutting engagement with the wheel surface 17 along radial tool guide rams 7 and axial guide rails 8.

Figure 4:
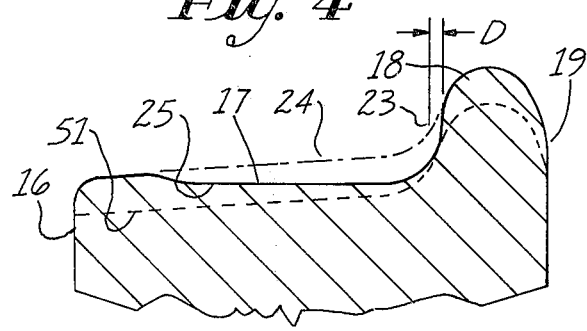
FIG. 4 is a sectional view of a typical worn wheel showing original, worn, and reclaimed contours.

The tread surface 17 of the wheel is machined to a predetermined contour 51, as illustrated in broken lines in FIG. 4, according to instructions received from an automatic control system.

The gage assembly 9 is mounted on the machine for sliding radial movement along guide posts 10 and support rods 11. Although, in general, two gage assemblies would be used, only one will be described since they would be identical.

Figure 2:
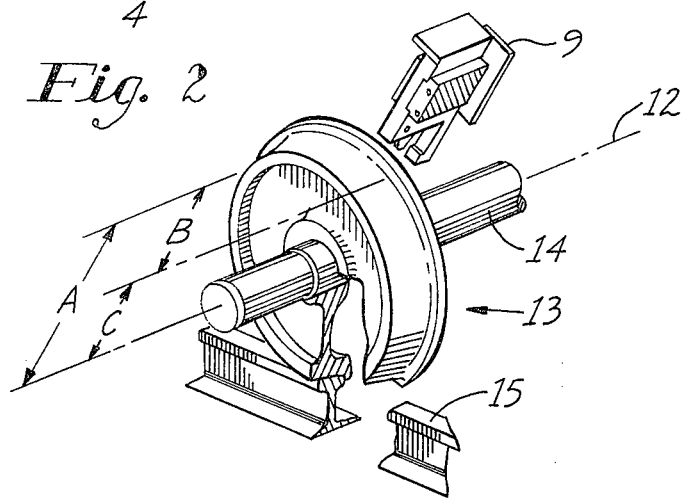
FIG. 2 is a perspective view of a typical railroad wheel with a partial section view showing its engagement with a railroad track; in addition, the gaging assembly of the invention is shown schematically in order to illustrate the various distances the gage assembly moves with respect to the wheel.
Figure 3:
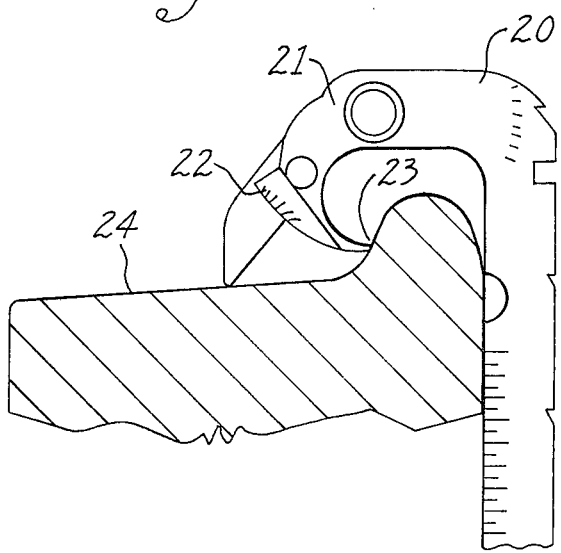
FIG. 3 is a plan view of a standard AAR wheel gage as it is applied to a normal wheel contour shown in section.

A typical railroad wheel 13 is shown in FIG. 2 engaging rail 15 and having an axle 14 for rotation about an axis 12. The various wheel contour surfaces are best shown in FIG. 4 and include tread edge 16, tread 17, flange 18 and flange edge 19. The wheel contour is generally shaped as shown in FIG. 3 with a slight radially outward taper increasing gradually from the tread edge 16 to the flange 18. A typical worn contour 25 is shown in FIG. 4. In order to determine the depth of cut required to reclaim the original contour a gage 20, as shown in FIG. 3, has been used. As shown in the drawing, this gage 20 is manually placed in engagement with the flange edge 19 and the tread 17. A movable pivot arm 21 is moved into contact at a gaging point 23 located on the flange 18. Calibrations 22 are provided on the pivotable arm 21 in order to ascertain the distance D, as shown in FIG. 4, that the gaging point 23 has moved because of wear. This distance D is calibrated in terms of the depth of cut in the machining procedure.

The gaging assembly 9 of this invention is best shown in FIG. 5. A support block 26 is fixed to radial guide post 10 and the guide post is mounted for radial movement toward the wheel surface. Drive block 48 may, in turn, be mounted for movement along support rod 11. The guide rod 10 may be driven by any suitable means, for example, piston and cylinder 54.

Support block 26 is constructed having guide grooves 27 and guide bars 28. A biasing spring 29 is secured to a side of the block 26 as shown. A flange edge contactor 32 is slidably mounted on the support block 26 for spring biased movement perpendicular to the overall radial movement of the gage assembly 9. The element 32 consists of a contactor finger 33 secured to a bracket portion 34. Mating grooves 52 are constructed in the bracket portion 34 to engage the guide grooves 27 of support block 26. A connecting flange 35 extends from the bracket portion 34 and is constructed with apertures to accommodate the guide bars 28 of the support block 26. The flange edge contactor 32 is, therefore, mounted for slidable movement along guide bars 28 on the support block 26 and is normally biased away from the flange edge surface 19 by spring 29. The bracket portion 34 of the flange edge contactor 32 is constructed with suitable guide grooves 53 and apertures 36 to accommodate tread contactor 37.

Tread contactor 37 has mating grooves 39 for engagement with the guide grooves 53 on the flange edge contactor 32. Guide bars 40 are secured to the tread contactor 37 and slidably engage bracket portion 34 through apertures 36. In this manner tread contactor 37 is slidably mounted on flange edge contactor 32 for movement in a direction generally parallel to the overall movement of the gaging assembly 9. This movement is spring biased toward the tread surface 17 by spring 41 which is secured between bracket portion 34 and tread contactor 37. A tread contacting finger 38 is constructed extending downward from the tread contactor 37.

Flange contacting finger 42 is pivotally mounted to tread contactor 37 by pivot pin 45 through aperture 44. The flange contacting finger 42 is constructed having a gaging point projection 43 extending outward therefrom and is also joined to flange edge contactor 32 by means of an open slot 46 and engagement with joining pin 47 on flange edge contactor 32. An encoder 30 is mounted on support block 26 and is responsive to movement of flange edge contactor 32 through the rack and pinion 50. Accordingly, the encoder 30 generates pulses proportional to the movement of the flange edge contactor 32. A second encoder 31 is responsive to movement of the radial guide post 10 through a drive block 48. This motion may also be transmitted through a rack and pinion means as shown at 49.

Referring now to FIG. 2, it can be seen that the gage assembly 9 is mounted at a fixed distance A from the machine turning axis 2 and can be driven downward a distance B where tread contactor 37 touches the wheel tread surface 17. The actual diameter of the worn wheel can be ascertained from the relative position of the gage at this point (simply distance A minus distance B equals actual radius C). However, it is desired to get the new diameter to which the wheel is to be ground. In order to accomplish this, gage assembly 9 is driven further downward until the gaging point projection 44 and the flange edge contacting finger 33 engage the flange, and flange edge 19 respectively. This additional movement of the gage assembly 9 corresponds substantially to distance D as shown in FIG. 4. Therefore, signals from encoder 31 will be proportional to a distance B plus D and the new diameter of the wheel can be derived from this information.

The interrelated movement of the elements of the gage assembly 9 therefore provides for an overall radial movement of the assembly a distance B plus D, as indicated by encoder 31, from which the new diameter can be derived. Movement of flange edge contactor 32, as recorded by encoder 30, provides information pinpointing the location of the flange edge. This information is needed to formulate the exact profile and contour path for the machining operation of the wheel. Additional encoders could be used to obtain other information if such is necessary.

I claim:

1. A gage for measuring parameters from the contour of a worn railroad wheel, said wheel contour being defined by tread edge, tread, flange, and flange edge portions and for supplying said parameters to a system for automatically controlling a lathe which is adapted for reclaiming said wheel contour comprising:

A. a support block having means for mounting said block on the lathe at a predetermined radial distance from the turning axis of the lathe, for radial movement toward the wheel contour;

B. first and second contacting members mounted on the support block for movement thereon and also mutually interconnected to allow for limited relative movement between said contacting members, said members being situated on the support to sequentially engage the wheel tread and flange surfaces as the support block moves radially toward the wheel contour, the relative movement between said contacting members being indicative of the new diameter of the railroad wheel which is required to automatically adjust the lathe for the reclaiming operation; and C. encoder means operatively connected to the support block and contacting member assembly to generate signals relative to the movement thereof and supply said signals to the automatic control system of the lathe.

2. A gage for measuring parameters from the contour of a worn railroad wheel as described in claim 1 wherein the support block is also mounted on the lathe at a predetermined axial position and further comprising:
   A. a third contacting member mounted on the support block for movement thereon, and also interconnected with the first and second contacting members for limited relative movement, said third contacting member being situated to engage the flange edge of the wheel as the support block moves radially toward the wheel contour, the relative movement of said third contacting member being indicative of the axial position of the wheel.

3. A gage for measuring parameters from the contour of a worn railroad wheel, said wheel contour being defined by tread edge, tread, flange, and flange edge portions and for supplying said parameters to a system for automatically controlling a lathe which is adapted for reclaiming said wheel contour comprising:
   A. a support block having means for mounting said block on the lathe at a predetermined radial distance from the turning axis of the lathe, for radial movement toward the wheel contour;
   B. first and second contacting members mounted on the support block for movement thereon and also mutually interconnected to allow for limited relative movement between said contacting members, said members being situated to sequentially engage the wheel tread and flange surfaces as the support block moves radially toward the wheel contour, the relative movement between said contacting members allowing an overall movement of the support block which is equal to the difference between the predetermined radial distance from the turning axis of the lathe and the reclaimed radius of the wheel; and
   C. an encoder operatively connected to the support block to generate signals relative to the total movement thereof.

4. A gage for measuring parameters from the contour of a worn railroad wheel as described in claim 3 wherein the support block is also mounted on the lathe at a predetermined axial position and further comprising:
   A. a third contacting member mounted on the support block for movement thereon ans also interconnected with the first and second contacting members for limited relative movement, said third contacting member being situated to engage the flange edge of the wheel as the support block moves radially toward the wheel contour, the relative movement of said third contacting member being indicative of the axial position of the wheel; and
   B. a second encoder operatively connected to the third contacting member to generate a signal relative to the movement thereof.

5. A gage for measuring parameters from the contour of a worn railroad wheel, said wheel contour being defined by tread edge, tread, flange, and flange edge portions and for supplying said parameters to a system for automatically controlling a lathe which is adapted for reclaiming said wheel contour comprising:
   A. a support block having means for mounting said block on the lathe at a predetermined radial distance from the turning axis of the lathe for radial movement toward the wheel contour;
   B. a tread contactor slidably mounted on the support block through appropriate mounting means for movement in a direction parallel to the direction of movement of the support block;
   C. a flange contactor pivotally mounted on the tread contactor and also pivotally connected to the mounting means in a manner which causes pivotal movement of said flange contactor when relative movement between the mounting means and the tread contactor occurs.

6. A gage for measuring parameters from the contour of a worn railroad wheel as described in claim 5 wherein the relative movement between the tread contactor, flange contactor and mounting means allows an overall movement of the support block which is equal to the difference between the predetermined radial distance from the turning axis and the reclaimed radius of the wheel.

7. A gage for measuring parameters from the contour of a worn railroad wheel as described in claim 5 wherein the support block is also mounted on the lathe at a predetermined axial position and the mounting means further comprises:
   A. a bracket element slidably mounted on the support block for movement in a direction perpendicular to the direction of movement of the support block;
   B. a flange edge contacting finger extending radially downward toward the wheel from the bracket element; and
   C. a second encoder operatively connected to the bracket element to generate signals according to the relative movement between the support block and said bracket element.

8.. A gage for measuring parameters from the contour of a worn railroad wheel as described in claim 5 wherein the relative movement between the mounting means and the tread contactor is spring biased toward the wheel contour.

9. A gage for measuring parameters from the contour of a worn railroad wheel as described in claim 7 wherein the relative movement between the bracket element and the support block is spring biased away from contact between the flange edge of the wheel and the flange edge contacting finger.

10. A gage for measuring parameters from the contour of a worn railrod wheel, said wheel contour being defined by a tread edge, tread, flange, and flange edge portions and for supplying said parameters to a system for automatically controlling a lathe which is adapted for reclaiming said wheel contour comprising:
   A. a support block mounted on the lathe at a predetermined radial distance from the turning axis of the lathe, and at a predetermined axial position for radial movement toward the wheel contour;
   B. a bracket element slidably mounted on the support block for movement in a direction perpendicular to the direction of movement of the support block, said bracket element having a flange edge contacting finger extending downward therefrom, said bracket element being spring biased away from the flange edge;

C. a tread contactor slidably mounted on the bracket element for movement in a direction parallel to the direction of movement of the support block, said tread contactor being spring biased toward the wheel contour;

D. a flange contactor pivotally mounted on the tread contactor and also pivotally connected to the bracket element in a manner which causes pivotal movement of said flange contactor when relative movement between the bracket element and the tread contactor occurs;

E. drive means operatively connected to the support block to cause movement of said support block radially toward the wheel contour;

E. a first encoder operatively connected to the support block to generate a signal relative to the total movement thereof; and G. a second encoder operatively connected to the bracket element to generate a signal according to the relative movement between the support block and said bracket element.

11. A gage for measuring parameters from the contour of a worn railroad wheel as described in claim 8 wherein the relative movement between the tread contactor, flange contactor and bracket element allows an overall movement of the support block which is equal to the difference between the predetermined radial distance from the turning axis and the reclaimed radius of the wheel and a movement of the bracket element which determines the location of the flange edge.

* * * * *